May 9, 1961　　　　J. V. DAVIS　　　　2,983,360
CONVEYING APPARATUS
Filed Nov. 23, 1959　　　　　　　　　　　6 Sheets-Sheet 1

INVENTOR.
John V. Davis.
BY

INVENTOR.
John V. Davis.

May 9, 1961 J. V. DAVIS 2,983,360
CONVEYING APPARATUS
Filed Nov. 23, 1959 6 Sheets-Sheet 6

INVENTOR.
John V. Davis
BY
Harness, Dickey & Pierce
ATTORNEYS

United States Patent Office 2,983,360
Patented May 9, 1961

2,983,360
CONVEYING APPARATUS

John V. Davis, Grosse Pointe, Mich., assignor to The Udylite Corporation, Detroit, Mich., a corporation of Delaware Filed Nov. 23, 1959, Ser. No. 854,858
15 Claims. (Cl. 198—19)

This invention broadly relates to conveying apparatus and more particularly to apparatus for conveying workpieces through a series of liquid treating steps in a predetermined treating sequence.

Conveying machines of the general character herein described are extensively utilized in industry for automatically processing a variety of workpieces through various treating sequences which often include one or more electrochemical or electroplating steps. The workpieces are conventionally supported on suitable work carriers which are intermittently driven along a path adjacent a series of aligned treating receptacles or tanks in which the workpieces are sequentially immersed. Suitable lifting or elevating means are incorporated in the conveying apparatus for periodically lifting the workpieces in order that they may be transferred over the partitions separating adjoining treating receptacles.

The increasing complexity of processing sequences and the need for incorporating maximum flexibility and versatility in conveying machines to meet rapid changes in product design and processing techniques have contributed to the construction of conveying machines having increasingly complex structure and elaborate control means for synchronizing the operating functions of the various components. These factors have caused a substantial increase in the cost of automated machinery and the susceptibility thereof to malfunction with a resultant loss of production efficiency and increased maintenance costs.

Accordingly, it is a primary object of the present invention to provide a highly versatile conveying machine that is of simple design and construction enabling proper coordination of operating functions by a relatively simple control system.

Another object of this invention is to provide a conveying machine incorporating a unitary simplified pusher and elevating mechanism for moving the workpieces through the treating sequence and periodically lifting them so that they are transferred over the partitions separating adjoining treating receptacles.

Still another object of this invention is to provide a conveying machine employing a reciprocating cam elevating mechanism which operates in conjunction with the reciprocating pusher mechanism that provides a better coordinated and a more simplified and flexible conveying apparatus than similarly functioning types heretofore known.

A further object of this invention is to provide a conveying machine incorporating in the cam lifting mechanism, a lost-motion cam which enables delayed set-down of selected workpieces in one or more multiple station treating tanks thereby greatly increasing the processing versatility of the machine.

Another object of this invention is to provide a conveying machine incorporating therein a skip cam or rail mechanism whereby selected workpieces may be diverted and completely omitted from one or more treating steps thereby enhancing the flexibility and processing versatility of the conveying machine.

Still another object of this invention is to provide a conveying machine that is of low cost, simple design, extremely versatile and which is of durable and dependable operation.

The general objects stated above are achieved by a structure characterized by a longitudinally reciprocable pusher bar having thereon a plurality of longitudinally spaced elevating cams coacting with a plurality of laterally extending work supporting arms movably mounted on a supporting rail which supporting arms are longitudinally and vertically moved in a predetermined sequence as the pusher bar is reciprocated. The objectives of achieving a high degree of versatility and processing flexibility as set forth in the specific objects of this invention are accomplished by the provision of a longitudinally reciprocable overlapping secondary cam movable relative to an elevating cam for supporting a work supporting arm in the raised position for a period after the other supporting arms are lowered thereby achieving a delayed set-down operation. Additionally, skip operation is provided by incorporating an elongated cam on the reciprocating pusher bar maintaining a supporting arm in the elevated position at selected stations along the path of travel of the supporting arms.

Other objects and advantages of the present invention will become apparent from the following detailed description taken in conjunction with the accompanying drawings, wherein.

Figure 1:
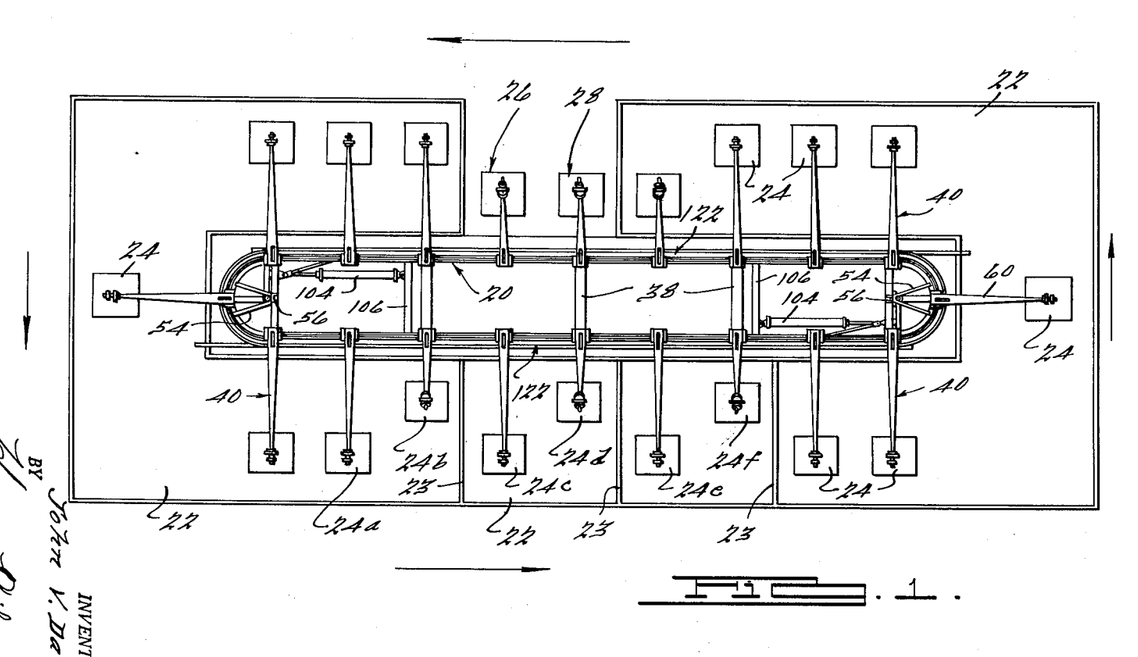
Figure 1 is a plan view of a conveying machine incorporating the preferred embodiments of this invention and illustrating a typical arrangement of treating receptacles disposed therearound.
Figure 2:
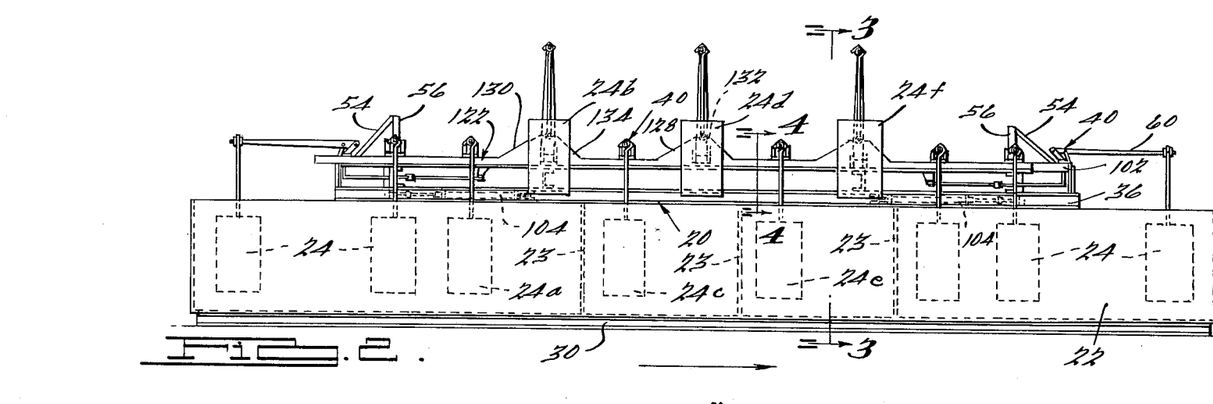
Fig. 2 is a side elevation view of the conveying machine shown in Figure 1 and wherein the reciprocating pusher and cam elevating mechanism is in the fully retracted position preparatory to the advancing stroke.
Figure 3:
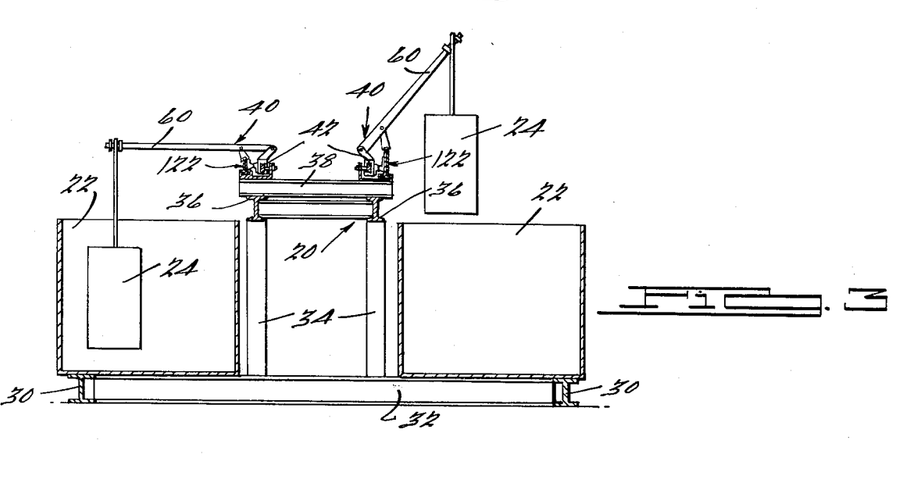
Fig. 3 is a transverse vertical sectional view of the conveying machine shown in Fig. 2 and taken along the line 3—3 thereof.

Referring now to the drawings and as may be best seen in Figures 1–3, a conveying machine incorporating the preferred embodiments of this invention is comprised of a central supporting frame 20 around which a series of aligned treating receptacles or tanks 22 are disposed separated by intervening tank partitions 23 and in which tanks the work-pieces suspended on racks 24 are sequentially immersed. Electrification of the workpieces on the racks 24 at stations where an electrochemical or electroplating operation is to be performed may be achieved by any of the means well known in the art. The conveying machine shown in the drawings is of the turn-around type comprising a pair of substantially straight and parallel side sections connected at their ends by arcuate turn-around sections. The path of travel of the workpieces in a machine of this type is in a closed loop pattern commencing at the loading station 26 as shown in Figure 1 and terminating at the unloading station 28 adjacent to the loading station 26. It will of course, be appreciated by those skilled in the art that the specific embodiments of this invention are equally applicable to conveying machines of the straight-through type wherein the workpieces are loaded at one end of the machine and are conveyed therealong through the treating sequence and unloaded at the other end thereof. Straight-through type conveying machines may comprise an elongated straight frame or a series of connected straight sections having configurations as, for example, a V-shape, and L-shape or a Z-shape which configuration is dependent on factors such as plant layout and integration with other processing machines.

The central supporting frame 20 in the specific conveying machine herein described is comprised of a pair of longitudinal base beams 30 connected to each other by a series of transverse base channels 32 which provide a supporting platform on which an aligned series of treating receptacles 22 are mounted. A series of spaced upright columns 34 are rigidly affixed at their lower ends to the transverse base channels 32 and are interconnected at their upper ends by longitudinal support beams 36 and transverse members 38 which in turn provide an elevated supporting platform for the work carriers and reciprocating pusher and elevating cam mechanisms. A plurality of work carriers 40 are movably mounted for horizontal travel on a continuous supporting rail 42 comprising a pair of straight sections disposed along the sides of the machine connected at their ends by an arcuate turn-around rail section. As shown in the drawings, and particularly Fig. 4, the supporting rail 42 is detachably secured at intervals to an upstanding flange 43 of an angle iron stringer 44 secured at the base flange 45 thereof to the upper surface of the transverse members 38 and extending around the machine in spaced substantially parallel relationship to the supporting rail 42. The supporting rail 42 may be secured by a countersunk head machine screw 46 extending through the supporting rail 42, and a cylindrical spacer sleeve 48 bolted to the upstanding flange 43 of the angle iron stringer 44. The arcuate end portions of the angle iron stringer 44 are supported in a horizontal position by means of diagonal braces 54 connected to the upper portions of stub columns 56 rigidly mounted at each end of the central frame 20.

A plurality of the work carriers 40 are movably mounted on the supporting rail 42 and intermittently advanced therealong. Each of the work carriers 40 is comprised of a roller bracket 58 in rolling engagement with the supporting rail 42 and a work supporting arm 60 pivotally mounted on the roller bracket 58 and laterally extending out over the treating receptacles 22. The roller bracket 58 is comprised of a body member 62 incorporating therein a series of side rollers 64 and a pair of top rollers 66 in bearing contact with the exterior surfaces of the supporting rail 42. A pair of rearwardly extending lugs 68 disposed in spaced relationship is fixedly secured to the upper body member 62 and has a pivot pin 70 extending therebetween on which the work supporting arm 60 is pivotally mounted. Because of the low friction between the work carriers and the supporting rail it is generally preferred to incorporate suitable engaging means to prevent horizontal movement of the work carriers 40 except during the forward transfer stroke of the pusher mechanism. As may be best seen in Figs. 4 and 5, suitable engaging means may comprise a latching pawl 72 affixed to one end of a pivot pin 78 rotatably mounted in the base of the body member 62 and which latching pawl is resiliently biased into engagement with a gear rack 74 disposed along the lower edge of the supporting rail 42. The latching pawl 72 is disengaged from the gear rack 74 by the movement of an actuating lever 76 affixed to the other end of the pivot pin 78. The latching pawl 72 is automatically pivoted downwardly and disengaged from the gear rack 74 when the actuating lever 76 is deflected to the right as viewed in Fig. 5 when engaged by the pusher transfer mechanism. A stop lug 80 affixed to the side surface of the body member 62 is adapted to abut the actuating lever 76 and restrict its pivoting travel. In addition, the stop lug 80 serves as a seat for a coil spring 82 which coacts with and resiliently urges the actuating lever 76 in a counterclockwise direction which in turn pivots the latching pawl 72 upwardly into engagement with the gear rack 74. The mutually engaging teeth on the latching pawl 72 and the gear rack 74 are provided with a contour so as to effect a smooth engagement and disengagement of the roller bracket 58 from the supporting rail 42. It will be understood, however, that body members may be alternately employed having cavities therein complementarily shaped to the supporting rail 42 and having the surfaces thereof in sliding engagement. The resulting sliding friction between the body members and the supporting rail is generally sufficient to restrict inadvertent horizontal movement of the work carriers, in which event the engaging means hereinbefore described may be dispensed with.

Figure 4:
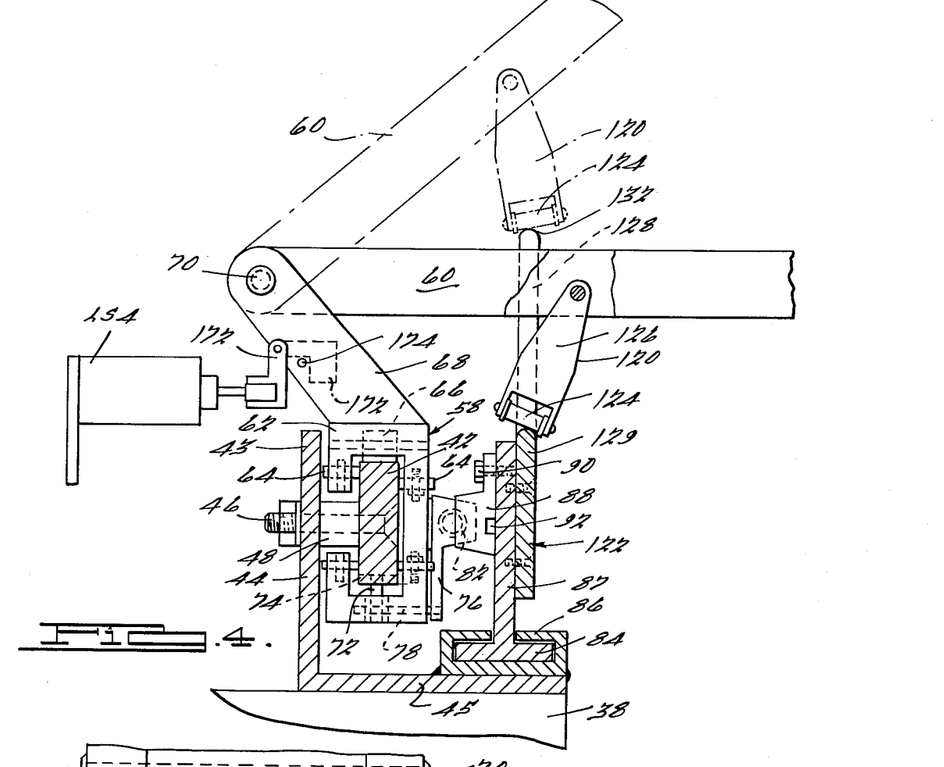
Fig. 4 is an enlarged fragmentary transverse sectional view of the work carrier supporting rail and pusher and lifting cam mechanism shown in Fig. 2 and taken along the line 4—4 thereof.
Figure 5:
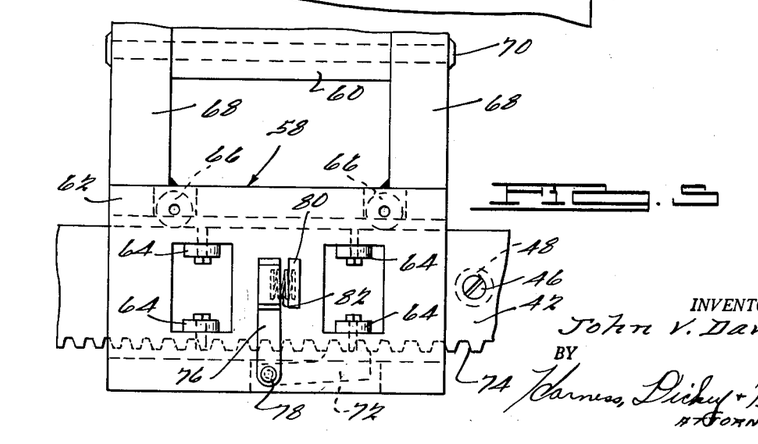
Fig. 5 is an enlarged fragmentary elevation view of the work carrier roller bracket mounted on the supporting rail.
Figure 6:
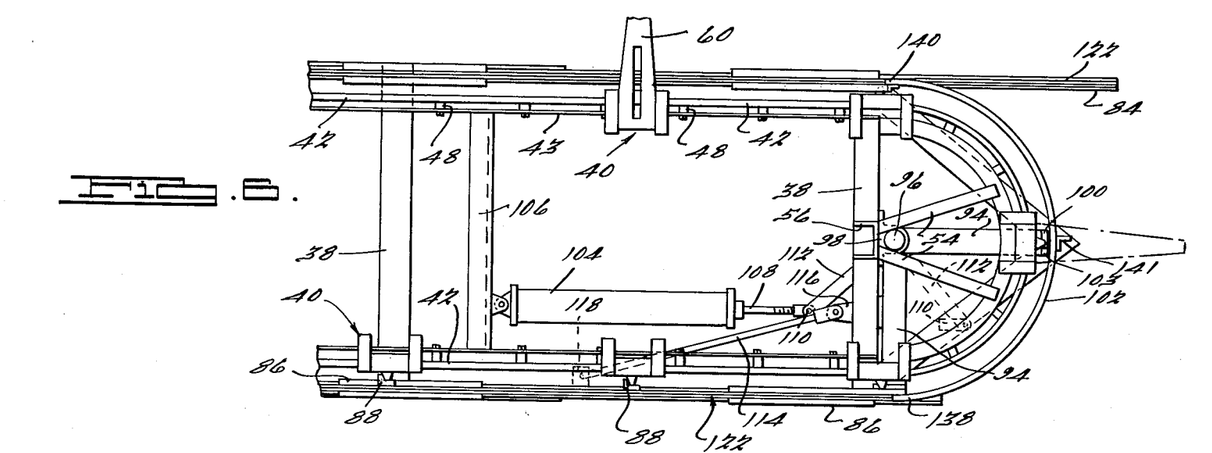
Fig. 6 is an enlarged fragmentary plan view of one end portion of the conveying machine and showing in particular the means for reciprocating the pusher cam elevating mechanism and for rotating the pusher arms disposed in the arcuate end portions of the machine.
Figure 7:
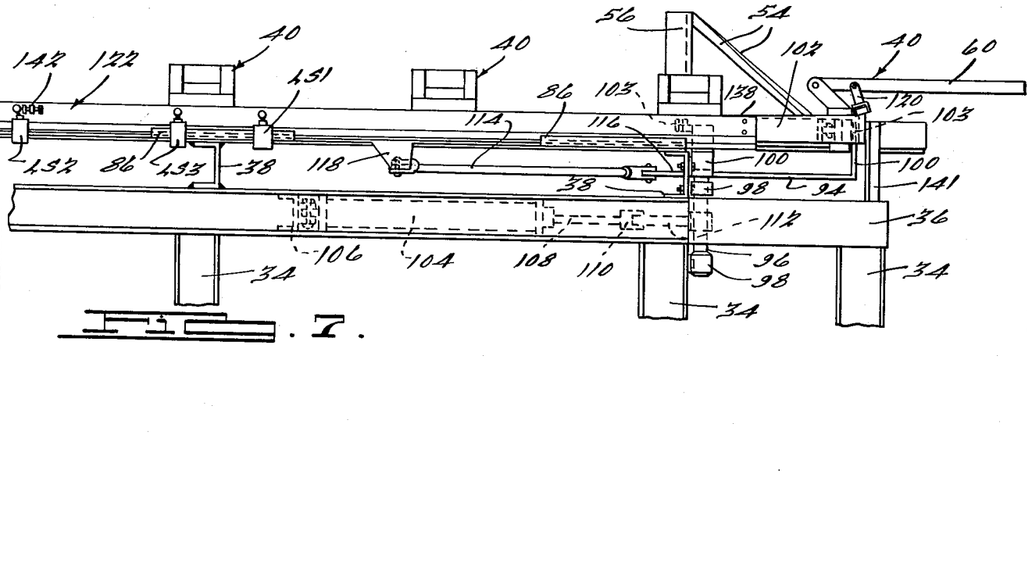
Fig. 7 is a fragmentary side elevation view of the end portion of the conveying machine shown in Fig. 6.

The work carriers 40 are intermittently advanced along the straight side portions of the supporting rail 42 by a reciprocating pusher mechanism slidably mounted longitudinally of and disposed outwardly from the work supporting rail 42. As shown in Fig. 4, the reciprocating pusher mechanism is comprised of a pusher bar 84 of an inverted T-shaped cross section which is in sliding engagement in a series of aligned guide shoes 86 rigidly affixed to the outer portion of the base flange 45 of the angle iron stringer 44. A vertical flange 87 of the pusher bar 84 is provided with a series of longitudinally spaced pivotally mounted pushers 88 which are adapted to engage the outwardly projecting portions of the actuating levers 76 on the roller brackets 58. The pushers 88 are pivotally suspended from a pivot screw 90 detachably secured to the upper portion of the vertical flange 87 of the pusher bar. A stop pin 92 is rigidly affixed to the vertical flange 87 and is adapted to abut the pusher 88 to prevent it from pivoting on the advancing stroke of the pusher bar 84. The pivoting action of the pushers 88 permits them to pivot upwardly and out of alignment with the actuating lever 76 during the retracting stroke of the pusher bar and subsequently after clearing the actuating levers 76 drop down into alignment behind the actuating levers 76 preparatory to the next advancing stroke. Movement of the work carriers 40 around the arcuate end portions of the supporting rail 42 is achieved by a pair of radially extending pusher arms 94 fixedly secured to a vertical shaft 96 rotatably mounted at substantially the center of each of the arcuate turn-around sections. Inasmuch as the pusher assemblies in the arcuate end portions of the conveying machine are identical only one such assembly need be described in detail. The vertical shaft 96 as shown in Figs. 6 and 7 wherein the supporting arms 60 have been omitted for clarity is rotatably supported by suitable bearings 98 rigidly secured to the central frame. Each of the outer end portions of the pusher arms 94 is provided with an upstanding flange 100 extending upwardly therefrom between the forward surface of the roller bracket 58 and inner surface of an arcuate cam track 102 and is provided with a pivoting pusher 103 pivotally mounted at the upper end thereof that is adapted to engage actuating lever 76 on the roller bracket 58.

Reciprocating movement of the pusher bar 84 and rotation of the pusher arms 94 is achieved by a hydraulic cylinder 104 pivotally mounted at its closed end to a transverse brace 106 and disposed longitudinally of the pusher bar 84. The end of a piston rod 108 extending through the open end of the hydraulic cylinder 104 is connected by means of a suitable swivel joint 110 to the end portion of a lever arm 112 rigidly affixed to and radially extending from the vertical shaft 96. The forward stroke of the piston rod 108 causes the lever arm 112 and the vertical shaft 96 to rotate to the position shown in phantom in Fig. 6 which in turn rotates the pusher arms 94 through an angular displacement of approximately ninety degrees. The rotating movement of the pusher arms 94 is transmitted to the pusher bar 84 by a drag link 114 pivotally connected at one of its ends to a lug 116 affixed to the pusher arm 94 adjacent the transverse member 38 and at its other end to a downwardly depending ear 118 connected to the base of the pusher bar 84. The transverse member 38 is provided with a suitably sized aperture in the upstanding flange portion thereof adjacent the hydraulic cylinder 104 to enable unrestricted passage therethrough of the lug 116 and the drag link 114. In addition, a portion of the base flange 45 of the angle stringer 44 is recessed adjacent the reciprocating path of the depending ear 118 to permit unrestricted travel thereof. By this arrangement, the rotating movement of the pusher arms 94 is synchronized with the reciprocating movement of the pusher bar 84 during the forward and retracting stroke of the piston rod 108. In the specific arrangement herein shown, both hydraulic cylinders 104 are simultaneously actuated and movement of the work carriers along the supporting rail 42 is achieved in uniform and synchronized sequence. It will of course, be appreciated by those skilled in the art that an alternate satisfactory pusher mechanism may include only one hydraulic cylinder 104, the reciprocating motion of which is transferred to the pusher arms 94 at each of the arcuate end sections of the machine and the reciprocating pusher bars disposed along each of the straight side sections of the machine by suitable linkages such as the drag link 114.

As the work carriers 40 are intermittently advanced along the supporting rail 42 the work supporting arms 60 laterally extending over the treating receptacles are periodically raised and lowered in order that the work racks 24 suspended therefrom may be transferred over the intervening tank partitions 23. The pivotally mounted work supporting arms 60 are continuously supported in the appropriate position and are periodically raised and lowered by the coaction of a cam follower 120 in rolling contact with the upper surface of a reciprocating cam track 122. As shown in the drawings, and particularly Fig. 4, the cam follower 120 is comprised of a spool roller 124 rotatably mounted on a shackle 126 which is pivotally mounted at its upper end portion to the work supporting arm 60. The reciprocating cam track 122 is detachably secured to the outer surface of the vertical flange 87 of the pusher bar 84 and is comprised of a series of detachably secured elevating cams 128 and horizontal sections 129 appropriately positioned thereon relative to the tank partitions 23 to raise the work supporting arms 60 in order that the racks 24 may be transferred over the partitions. By this arrangement the elevating cams 128 and horizontal sections 129 may be removed and repositioned on the pusher bar 84 to adapt the machine to any specific treating cycle. The work supporting arm 60 is shown in phantom in Fig. 4 in the raised position wherein the cam follower 120 is positioned on the top portion of the elevating cam 128. As shown in the drawings, the elevating cams 128 are comprised of a lifting ramp 130, a flat crest portion 132 and a lowering ramp 134. The angular incline from the horizontal of the lifting ramp 130 is preferably smaller in magnitude than the angular incline of the lowering ramp 134 to achieve a gradual lifting of the work carrier arms 60. The flat crest portion 132 is provided as an elevated rest position for the cam followers 120 during the forward advancing stroke of the reciprocating pusher mechanism. The horizontal sections 129 of the reciprocating cam track 122 disposed between adjacent elevating cams 128 may be provided with a scalloped or undulating upper surface 136 (Fig. 8) which provides for a gentle vertical oscillation of the work supporting arm 60 to cause a gentle agitation of the work racks 24 immersed in the treating solutions. This action may be achieved by slowly reciprocating the pusher bar 84 and the reciprocating cam track 122 through a short stroke sufficient to cause the cam followers 120 to ride up and down the undulating surface 136 on the horizontal sections 129. The reciprocating movement may be provided by the hydraulic cylinders 104 or by smaller auxiliary cylinders (not shown) connected to the pusher bar 84. The length of each of the elevating cams 128 is slightly less than the length of the reciprocating stroke of the reciprocating cam track 122 to enable lowering and raising the work support arms 60 during the retracting stroke of the reciprocating cam track as will be subsequently described in detail.

As the work carriers 40 approach the arcuate turnaround portions of the machine the cam followers 120 on the work supporting arm 60 ride up on the overlying wedge portion 138 of the arcuate cam track 102 as may be best seen in Figs. 6 and 7 and thereafter are in rolling contact with the upper edge of the arcuate cam track 102. In a similar manner, the cam followers 120 roll off an overlying wedge portion 140 at the other end of the arcuate cam track as the work carrier 40 is transferred therearound and is repositioned on the reciprocating cam track 122. In the specific conveying apparatus herein described no provision is incorporated for raising the work supporting arm 60 along the arcuate turn-around portions of the machine. It will be understood, however, that such a lifting action may be achieved, for example, by incorporating a stationary lifting cam surface on the arcuate cam track 102 which would be effective to raise the work supporting arm 60 as the cam follower 120 moves up the lifting ramp portion thereof. The arcuate cam tracks 102 are supported in appropriate alignment with the reciprocating cam track 122 by vertical braces 141 and transverse members 38 as shown in Figs. 6 and 7.

In operation, the work carriers 40 are intermittently advanced along the straight side portions and arcuate turn-around portions of the machine by the reciprocating pusher bar 84 and the rotatably mounted pusher arms 94. When the reciprocating cam track 122 is in the fully retracted position as shown in Figures 1 and 2 the work racks 24b, 24d, and 24f are in the elevated position preparatory to the advancing stroke of the pusher bar 84. In that position the cam followers 120 of the respective work supporting arms 60 which are in the elevated position are positioned on the flat crest portions 132 of the elevating cams 128. The hydraulic cylinders 104 are simultaneously actuated advancing the pusher bar 84 and the reciprocating cam track 122 to the fully forward position during which movement each of the work carriers 40 are advanced in the direction of the arrows to the next adjacent work station. Accordingly, the work racks 24b, 24d, and 24f are horizontally transferred over the tank partitions 23 while in the raised position and work racks 24a, 24c and 24e are transferred in the lowered position and remain submerged in the treating solutions. The length of the advancing stroke of the pusher bar and reciprocating cam track is controlled by suitable limit switches mounted longitudinally of the pusher bar 84 as shown in Fig. 7 which are adapted to be actuated by an adjustable actuator 142 adjustably mounted on the pusher bar 84 or reciprocating cam track 122. Actuation of forward control limit switch LS1 is effective to close suitable solenoid actuated valves stopping the flow of pressurized hydraulic fluid into the closed ends of hydraulic cylinders 104 and simultaneously opening suitable solenoid valves permitting hydraulic fluid to flow into the open ends of the hydraulic cylinders 104 causing the piston rod 108 and the reciprocating cam track 122 to return to its fully retracted position. During the retracting movement of the reciprocating cam track 122 the cam followers 120 connected to the work supporting arms 60 which are in the elevated position move down the lowering ramps 134 of the elevating cams 128 whereby the work racks 24b, 24d, and 24f are lowered and immersed into the treating solutions. Further retracting movement of the reciprocating cam track 122 causes the lifting ramps 130 of the elevating cams 128 to engage the cam followers 120 of the work carriers supporting work racks 24a, 24c and 24e elevating them to the raised position. The retracting movement of the reciprocating cam track 122 and pusher bar 84 is halted when the actuator 142 contacts and actuates a rear control limit switch LS2 which closes the solenoid actuated valves stopping the flow of fluid into the open end of the hydraulic cylinders 104. The reciprocating cam track 122 remains in the fully retracted position for a predetermined time period which is regulated by a suitable dwell timer incorporated in the electrical control system and during which dwell period the immersed workpieces are subjected to the appropriate treatment in the treating receptacle. At the expiration of the dwell period the dwell timer energizes and opens the solenoid valves permitting hydraulic fluid to flow into the closed ends of the hydraulic cylinders 104 whereby the reciprocating cam track 122 and the pusher bar 84 commence another advancing stroke.

The single retracting stroke of the reciprocating cam track and pusher bar in the above described operating sequence has the inherent disadvantage in that single station tank operation is not practicable because the work supporting arm after being lowered by one cam during the initial retracting movement is immediately raised by the next adjacent cam during the final retracting movement. The resultant action is that of momentarily dipping the work rack into the tank instead of immersing it for a predetermined time interval. To achieve single station operation, a two station treating tank is necessary which substantially increases the length of the tanks required for a given treating sequence.

Accordingly, an alternate and preferred method of operation incorporates controls for achieving a two-stage retracting movement of the pusher bar 84 and the reciprocating cam track 122 in lieu of the single stage retracting movement heretofore described enabling single station operation in a single station tank. At the completion of the advancing stroke of the pusher bar and reciprocating cam track, actuation of the forward control limit switch LS1 immediately reverses the flow of hydraulic fluid to the hydraulic cylinders 104 as heretofore described and the reciprocating cam track and pusher bar commence their retracting movement. The retracting movement of the cam track and pusher bar is halted at an intermediate position coinciding with the point of travel at which the cam followers 120 of the elevated work support arms 60 have completed their downward movement along the lowering ramp portions 134 of the elevating cams 128 and prior to the engagement of the lifting ramps 130 with the cam followers 120 connected to supporting arms which are in the lowered position. Cessation of the retracting movement of the cam track and pusher bar is achieved, for example, by an intermediate limit switch LS3 disposed between the forward and rear control limit switches LS1 and LS2, respectively, which when actuated by the actuator 142 during the return stroke of the reciprocating cam track, stops the flow of hydraulic fluid into the open end portion of the hydraulic cylinder 104 and simultaneously energizes the dwell timer which commences to time. It may also be desired during the dwell period to cause the reciprocating cam track 122 and the pusher bar 84 to oscillate through a small amplitude whereby the immersed work racks are caused to vertically oscillate in the treating solutions as dictated by the undulating surface 136 along the upper edge of the horizontal sections 129. At the completion of the dwell period the dwell timer re-energizes and opens the solenoid valves permitting hydraulic fluid to flow into the open end of the hydraulic cylinders 104 thereby retracting the reciprocating cam track through the second stage of the retracting stroke. During the second stage retracting movement the lifting ramps 130 of the elevating cams 128 engage the cam followers 120 of the work carriers disposed adjacent thereto lifting the work supporting arms 60 to an elevated position. At the completion of the retracting stroke, actuator 142 trips rear control limit switch LS2 which reverses the hydraulic flow of fluid to the hydraulic cylinders 104 causing the reciprocating cam track to advance forward to the fully advanced position. During the advancing movement, the actuator 142 again trips the intermediate control limit switch LS3 which may be either designed to be inoperative when tripped during the advancing stroke or may be effective to reset the dwell timer through a suitable latch relay which is subsequently unlatched when the limit switch LS3 is tripped during the retracting stroke.

The foregoing operating sequence of the conveying machine subjects each of the workpieces suspended from the work racks 24 to the same treating cycle. It is often desirable to incorporate means for varying the operating sequence of selected work carriers as they are conveyed around the conveying machine. Such means include, for example, a provision for delayed set-down of the work racks 24 in the first station of a multiple station treating tank or a skip operation wherein selected work racks completely skip immersion in one or more treating receptacles. The delayed set-down and skip features which will hereinafter be described, greatly increase the operating flexibility of the conveying machine embodying this invention.

Figure 8:
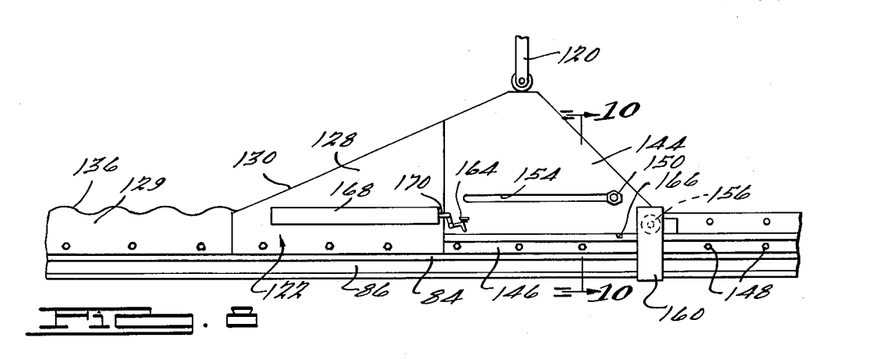
Fig. 8 is an enlarged fragmentary elevation view of a lost-motion cam mounted on the cam elevating means and disposed in the fully retracted position.
Figure 9:
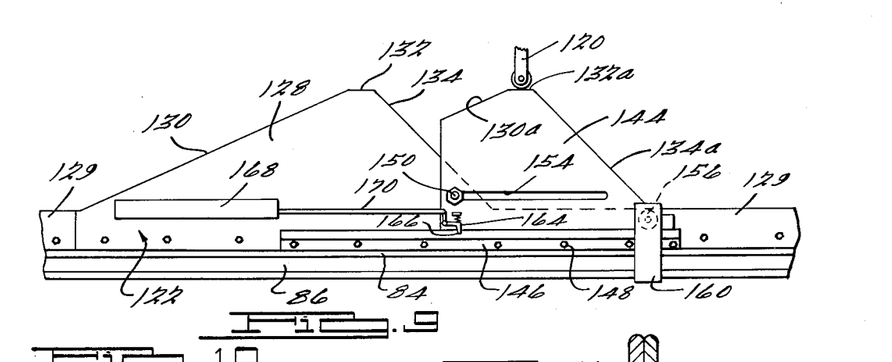
Fig. 9 is a fragmentary elevation view of the lost-motion cam disposed in the fully extended position.
Figure 10:
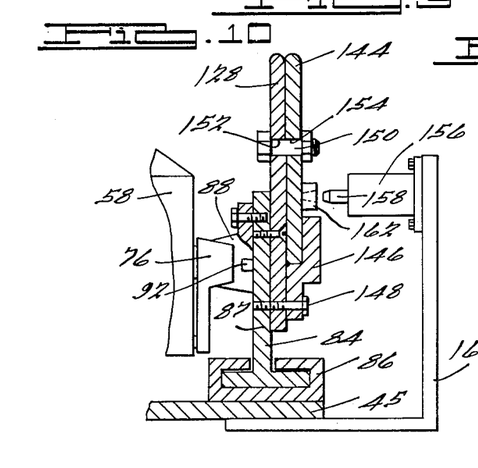
Fig. 10 is an enlarged transverse vertical sectional view of the lost-motion cam and cam elevating mechanism shown in Fig. 8 and taken along the line 10—10 thereof.

Delayed set-down of the work racks 24 at the first station of a multiple station tank for example, is achieved by incorporating a secondary or lost-motion cam 144 shown in Figs. 8–10 which is slidably mounted on the exterior surface of the reciprocating cam track 122 adjacent to and alignable with the elevating cam 128. The lost-motion cam 144 is of a configuration conforming to the forward portion of the elevating cam 128 including a lowering ramp 134a, a flat rest portion 132a and a fragmentary lifting ramp portion 130a. The lower base portion of the lost-motion cam 144 is slidably mounted in a slide member 146 having a Z-shaped cross section which slide member is detachably secured to the reciprocating cam track 122 and the pusher bar 84 by means such as a series of screws 148. The lost-motion cam 144 is maintained in appropriate vertical position and flat against the surface of the reciprocating cam track 122 by a slide bolt and nut assembly 150 extending through an aperture 152 in the elevating cam 128 and in alignment with an elongated horizontal slot 154 in the lost-motion cam 144. The length of the elongated slot 154 is substantially equal to the length of the first stage retracting movement of the pusher bar and reciprocating cam track. When the lost-motion operation provided by the lost-motion cam 144 is not desired the slide bolt and nut assembly 150 may be tightened, clamping the lost-motion cam 144 in retracted alignment with the elevating cam 128.

With the slide bolt and nut assembly 150 loosened to enable delayed set-down operation a typical operating cycle will be described commencing with the reciprocating cam track 122 in the fully retracted position wherein the lost-motion cam 144 is retracted and in alignment with the elevating cam 128. In that position a work supporting arm has been raised to the elevated position by the movement of the cam follower 120 up along the lifting ramp 130 of the elevating cam 128 and is positioned on the flat crest portion 132 of the elevating cam preparatory to the advancing stroke of the reciprocating cam track 122. The reciprocating cam track and pusher bar are then advanced to the forward position as shown in Fig. 8 and during which movement the elevated work rack is transferred over an intervening tank partition 23. As heretofore mentioned, the forward advancing movement of the reciprocating cam track is stopped when the forward control limit switch LS1 is tripped by the actuator 142. Tripping of the limit switch LS1 also serves to energize a suitable latch relay which closes its contacts and energizes a solenoid 156 having a resiliently biased locking plunger 158 which is normally in the retracted position. As shown in the drawings and particularly Fig. 10, the solenoid 156 is fixedly mounted longitudinally of the reciprocating cam track 122 by an L-shaped bracket 160. Energization of the solenoid 156 causes the locking plunger 158 to move outwardly and into engagement with a socket 162 fixedly secured to the lost-motion cam 144 and in axial alignment with the plunger 158. The lost-motion cam 144 maintained stationary relative to the frame of the conveying machine by the locking plunger 158 and the reciprocating cam track and pusher bar are then retracted through the first stage movement of the retracting stroke during which movement the cam follower 120 is placed in bearing contact on the flat crest portion 132a of the stationary lost-motion cam 144. The lost-motion cam 144 thereby maintains the follower 120 in the elevated position instead of permitting it to be lowered by rolling down the lowering ramp 134 of the elevating cam 128. The first stage retracting movement of the reciprocating cam track ceases when the intermediate limit switch LS3 is tripped which also serves to unlatch the latch relay controlling solenoid 156 de-energizing it and disengaging the locking plunger 158 from the socket 162. A resiliently biased and pivotally mounted latching lever 164 comes into register with and drops into a notch 166 disposed in the upper edge portion of the slide member 146 when the reciprocating cam track reaches the end of the first stage retracting movement thereby fixedly locking the lost-motion cam 144 relative to the elevating cam 128 in the position as shown in Fig. 9. At the completion of the dwell period as determined by the dwell timer the reciprocating cam track commences the second stage of its retracting movement wherein the elevating cam 128 and the lost-motion cam 144 move in unison in fixed spaced relationship and during which movement the cam follower 120 rolls down the lowering ramp 134a of the lost-motion cam 144 immersing the work rack into the treating solution below. When the reciprocating cam track 122 has attained its fully rearward position the limit switch LS2 is tripped by the actuator 142 halting the reciprocating action. The limit switch LS2 is also operative to energize a suitable fluid actuated cylinder or solenoid 168 affixed to the side of the elevating cam 128 retracting its extended piston rod 170 which pivots the latching lever 164 out of engagement with the notch 166 and retracts the lost-motion cam 144 rearwardly into alignment with the elevating cam 128. The piston rod 170 had formerly been unrestrictedly withdrawn from the fluid actuated cylinder or solenoid 168 during the first stage retracting movement of the reciprocating cam track during which movement the lost-motion cam 144 was maintained stationary by the locking plunger 158 of the solenoid 156.

The aforementioned operation of the lost-motion cam 144 is controllable through a master switch which when closed will cause a delayed set-down operation of each work carrier as it successively approaches that work station. Selective operation of the lost-motion cam may be achieved by manually controlling the master switch in order that only selected work carriers will be subjected to a delayed set-down operation or preferably by a control system selectively actuatable by the movement of the work carriers along the supporting rail 24. A suitable selective control system is shown in Fig. 4 employing a selector limit switch LS4 fixedly mounted on the central frame longitudinally of the path of travel of the work carriers 40 and adjacent to the elevating cam 128 provided with the lost-motion cam 144. Actuation of the selector limit switch LS4 is achieved by an actuator 172 pivotally mounted on one of the rearwardly extending lugs 68 of the roller bracket 58 which is alternately positionable between an operative position and a nonoperative position. The actuator 172 is shown in phantom in Fig. 4 in the operative position in which it is maintained by stop 174. In the operative position the actuator 172 is disposed in a downwardly extending position as shown in Fig. 4 and adapted to trip the limit switch LS4 as the work carrier is advanced along the supporting rail 42 just prior to reaching the next treating station. Tripping of the limit switch LS4 by the presettable actuator 172 during the advancing stroke of the reciprocating cam track and pusher bar serves to latch a suitable latch relay which energizes the electrical control circuit of the lost-motion cam. The latch relay remains in the latched position until the completion of the cycle and may be conveniently unlatched by the tripping of the intermediate limit switch LS3 during the advancing stroke of the reciprocating cam track. By this arrangement an operator at the loading station of the machine may position the actuator 172 in the appropriate position to achieve the desired treating sequence dependent upon the workpieces supported by the supporting arms.

Figure 11:
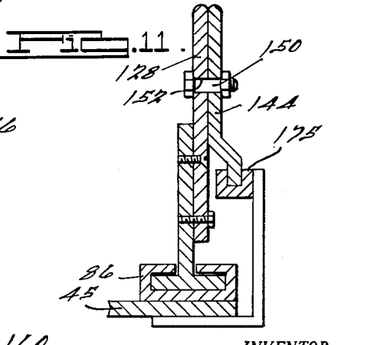
Fig. 11 is a vertical sectional view similar to Fig. 10 and showing an alternate method of slidably supporting the lost-motion cam.

A simplified installation of the secondary or lost-motion cam 144 is shown in Fig. 11 wherein the base portion of the lost-motion cam 144 is laterally offset and disposed in longitudinal alignment with and slidable engagement in slide guide 175 having a U-shaped cross section and fixedly secured to the central supporting frame by suitable brackets. The slide guide 175 extends longitudinally of the cam track 122 a distance corresponding substantially to the reciprocating travel of the elevating cam 128 and provides continuous support for the lost-motion cam. The base portion of the lost-motion cam 144 is snugly fitted into the slide guide 175 creating frictional resistance that resists relative movement therebetween. Slide bolt and nut assembly 150 affixed to the forward portion of the elevating cam 128 and slidable in the elongated slot 154 in a manner similar to that shown in Figs. 8 and 9 maintains the lost-motion cam 144 in appropriate vertical alignment and drivingly connects the lost-motion cam to the reciprocating cam track. When a delayed set-down operation is not desired, the slide bolt and nut assembly 150 is tightened as hereinbefore described clamping the lost-motion cam in alignment with the elevating cam 128 and preventing relative movement therebetween. When the slide bolt and nut assembly 150 is loosened, the lost-motion cam 144 is retained in the advanced position by the frictional coaction with slide guide 175 during the first stage retracting movement of the reciprocating cam track and maintains the cam follower 120 in the elevated position in the same manner as shown in Fig. 9. Further retraction of the reciprocating cam track during the second stage retracting movement retracts the lost-motion cam 144 by the coaction of slide bolt and nut assembly 150 and the slot 154 and during which retracting movement the cam follower 120 travels down the lowering ramp 134a. The lost-motion cam remains stationary during the initial advancing movement of the reciprocating cam track until it is once again in alignment with the elevating cam 128 at which point the slide bolt and nut assembly 150 abuts the forward end of the slot 154 overcoming the frictional resistance and advancing the lost-motion cam in unison with the elevating cam. The operating sequence provided by the alternate installation shown in Fig. 11 eliminates the need for the locking solenoid 156, the latching lever 164, and the solenoid or fluid cylinder 168 shown in Figs. 8 and 9.

Figure 12:
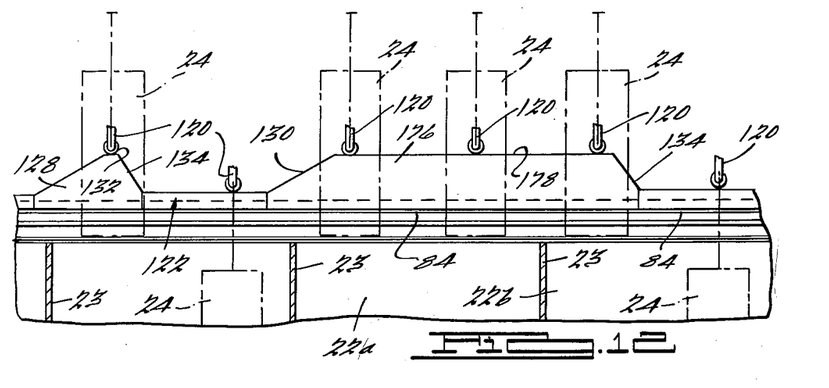
Fig. 12 is a fragmentary side elevation view of the conveying machine and showing in particular the arrangement of a skip cam mounted on the reciprocating cam elevating mechanism.

Skip operation of the work racks may be achieved by a skip cam 176 as shown in Fig. 12 whereby the work racks completely skip immersion at one or more treating stations by being retained in the elevated position. The skip cam 176 shown in Fig. 11 comprises an elongated cam having a lifting ramp 130 and lowering ramp 134 similar to that employed on the elevating cams 128. The horizontal upper edge 178 of the skip cam 176 may be of a length corresponding to the length of one, two, or more reciprocating strokes of the reciprocating cam track depending on the number of treating stations that are to be skipped. The skip cam 176 may be comprised of an integral plate as shown in Fig. 11, detachably secured to the pusher bar 84. In lieu of an integral skip cam a suitable rail (not shown) may be employed extending between and secured to the flat crest portions 132 of adjacent lifting cams 128 to maintain the work supporting arms in the raised position. The skip cam 176 employed as shown in Fig. 11 causes the work racks 24 to completely skip the treating receptacle 22a.

Figure 13:
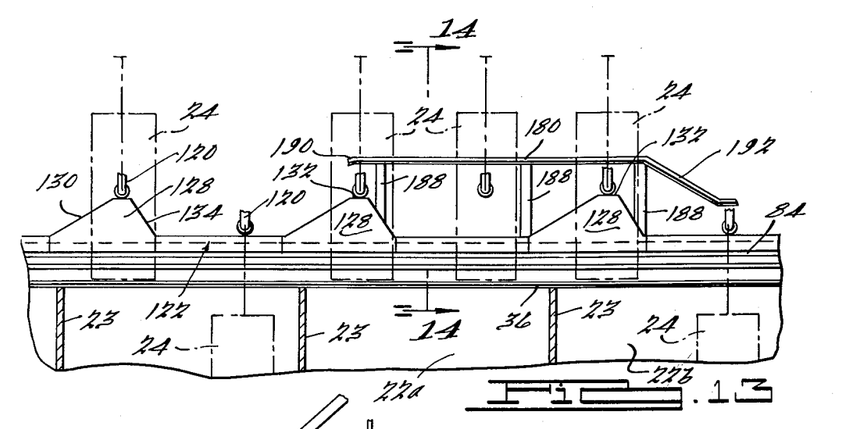
Fig. 13 is a fragmentary side elevation view of a portion of the conveying machine showing in particular a skip rail section which may be employed in lieu of the skip cam shown in Fig. 12.
Figure 14:
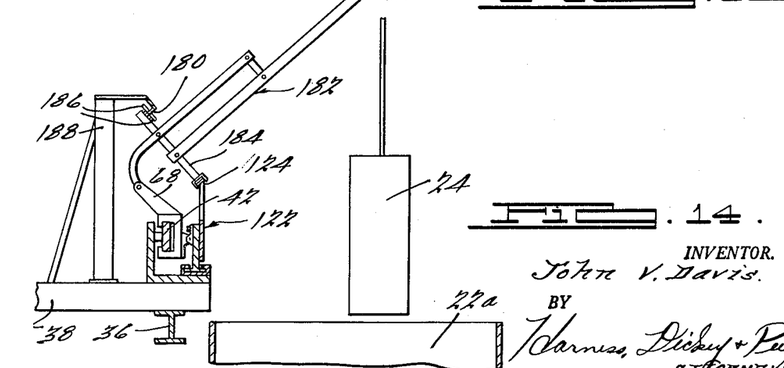
Fig. 14 is a vertical transverse sectional view of a portion of the conveying machine and skip rail section shown in Fig. 13 and taken along the line 14—14 thereof.

An alternate satisfactory work rack holdup mechanism which may be employed in lieu of the skip cam 176 is shown in Figs. 13 and 14 comprising a holdup rail 180 fixedly maintained in an elevated position longitionally of the supporting rail 42 and engageable by the work supporting arm maintaining it in an elevated position. A work supporting arm 182 of the well known parallelogram-type may be employed which has the advantage of minimizing the lateral movement of the suspended work rack 24 as the supporting arm is raised and lowered. A further advantage of the parallelogram-type work supporting arm 182 is that it maintains alignment of the spool roller 124 at the lower end of a link 184 with the upper edge of the reciprocating cam track 122 while the rollers 186 at the upper end of the link 184 are in rolling engagement with the holdup rail 180. The holdup rail 180 may be mounted in the suitable elevated position by means of diagonally braced columns 188 mounted on the transverse members 38 of the central frame. The forward or left end portion of the holdup rail 180 as viewed in Fig. 13 may be provided with a slight lifting ramp 190 to engage the rollers 186 on the work supporting arm 182 and elevating the arm slightly, thereby lifting the spool roller 124 from contact with the reciprocating cam track 122. The exit or right hand end of the holdup rail 180 may be provided with a similar cam surface to gradually lower the spool roller 124 in pressure contact with the crest portion 132 of the elevating cam 128. In the alternative, the holdup rail 180 may be provided with a lowering ramp 192 at the exit end thereof as shown in Fig. 12 whereby the work supporting arm is lowered during the advancing stroke of the reciprocating cam track. In the specific arrangement shown in Figs. 12 and 13 the holdup rail 180 is effective to cause the work racks 24 to completely skip the treating receptacle 22a in addition to the first treating station of the next adjacent treating receptacle 22b. Selectivity of the skip operation wherein only the selected ones of the work carriers are caused to skip the treating receptacle 22a may be achieved by mounting the rollers 186 so that they are movable into and out of engaging position with the holdup rail 180 thereby achieving increased processing flexibility.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In a processing machine, the combination comprising a rail, a work carrier mounted on said rail having an arm extending laterally of said rail, elevating means for vertically moving said arm upon longitudinal motion of said elevating means relative to said arm, advancing means for longitudinally moving said work carrier along said rail, means for reciprocating said elevating means, and means for actuating said advancing means in synchronization with said elevating means during a portion of the reciprocating movement of said elevating means.

2. In a processing machine, the combination comprising a rail, a work carrier mounted on said rail having an arm extending laterally of said rail, combination means including pusher means having thereon a plurality of longitudinally spaced cams, each of said cams having at least one surface spaced from the longitudinal axis of said pusher means such that contact of said cam surface and said arm upon longitudinal reciprocation of said pusher means causes said arm to be elevated and lowered and longitudinally moved thereby, and means for actuating said combination means.

3. In a processing machine, the combination comprising a rail, a work carrier mounted on said rail having an arm extending laterally of said rail, combination means including pusher means having thereon a plurality of longitudinally spaced aligned cams, each of said cams having a lifting surface and a lowering surface spaced from the longitudinal axis of said pusher means such that contact of said lifting surface and said lowering surface with said arm upon longitudinal reciprocation of said pusher means causes said arm to be elevated and lowered and longitudinally moved thereby, and means for actuating said combination means.

4. In a processing machine, the combination comprising a rail, a work carrier mounted on said rail having an arm extending laterally of said rail, combination means including a longitudinal reciprocable pusher bar, a series of longitudinally spaced pushers on said bar for advancing said work carrier along said rail during the advancing stroke, a plurality of longitudinally spaced aligned cams on said bar, each of said cams having a lifting surface and a lowering surface spaced from the longitudinal axis of said pusher bar such that contact of said arm with said lifting surface and said lowering surface causes said arm to be elevated and lowered during the retracting movement of said bar, and means for reciprocating said bar.

5. In a processing machine, the combination comprising a rail, a work carrier mounted on said rail having an arm extending laterally of said rail, combination means including pusher means having thereon a plurality of longitudinally spaced aligned cams, each of said cams having a lifting surface and a lowering surface connected by an intermediate surface, said arm movable to a raised position by said lifting surface and to a lowered position by said lowering surface as said pusher means is retracted, said arm being supported in the raised position by said intermediate surface and longitudinally advanced along said rail in that position by said pusher means, and means for maintaining said carrier in fixed position on said rail during the retracting movement of said pusher means.

6. A conveying apparatus comprising a frame, a work supporting rail mounted on said frame, a plurality of work carriers movably mounted on said work supporting rail, each of said work carriers including a pivotally mounted work supporting arm extending laterally of said supporting rail, a reciprocating bar slidably mounted on said frame adjacent to said supporting rail, means for reciprocating said bar, means drivingly connected to said bar for moving said work carriers along said rail as said bar moves therealong in one direction, a plurality of longitudinally spaced cams on said bar, each of said cams having at least one surface spaced from the longitudinal axis of said bar such that contact of said cam surfaces and said work supporting arms causes said arms to pivot from and to a raised position and a lowered position during movement of said bar relative to said arm.

7. A conveying apparatus comprising a central frame, a work supporting rail mounted on said frame, a plurality of work carriers movably mounted on said work supporting rail, each of said work carriers including a pivotally mounted work supporting arm extending outwardly and laterally of said supporting rail, reciprocating means mounted on said frame in alignment with said supporting rail for intermittently elevating and advancing said work carriers along said rail, means for reciprocating said reciprocating means, means associated with said work carriers for engaging said supporting rail and maintaining said work carriers in fixed position on said supporting rail during the retracting movement of said reciprocating means, and a plurality of longitudinally spaced cams on said reciprocating means, each of said cams having at least one surface spaced from the longitudinal axis of said reciprocating means such that contact of said cam surfaces and said work supporting arms causes said arms to pivot from and to a raised position and a lowered position during the retracting stroke of said pusher means.

8. A conveying apparatus comprising a frame, a work supporting rail mounted on said frame, a plurality of work carriers movably mounted on said work supporting rail, each of said work carriers including a pivotally mounted work supporting arm extending laterally of said supporting rail, a reciprocating pusher means mounted on said frame longitudinally of said supporting rail having a cam track thereon for intermittently advancing said work carriers along said rail and for supporting said work supporting arms intermediate the ends thereof, said cam track comprising a series of longitudinally spaced elevating cams and intervening horizontal track sections forming a continuous track, said work supporting arms movable from and to a raised position and a lowered position by said elevating cams in a predetermined sequence as said reciprocating cam track is reciprocated longitudinally with respect to said work carriers, and means for reciprocating said pusher means.

9. A conveying apparatus comprising a frame, a work supporting rail mounted on said frame, a plurality of work carriers movably mounted on said work supporting rail, each of said work carriers including a work supporting arm pivotally mounted at one end portion thereof and extending laterally of said supporting rail, a reciprocating pusher bar slidably mounted on said frame longitudinally of said supporting rail, means for reciprocating said pusher bar to and from an advanced position and a retracted position, a series of longitudinally spaced pushers pivotally mounted on said pusher bar for engaging and advancing said work carriers along said supporting rail during the advancing movement of said pusher bar, a cam track mounted on said pusher bar comprising a series of longitudinally spaced aligned elevating cams and horizontal sections forming a continuous track for supporting said work supporting arms intermediate the ends thereof, each of said elevating cams comprising a lifting ramp portion and a lowering ramp portion separated by an intermediate portion, all of said portions having a combined horizontal length not greater than the reciprocating length of a full stroke of said pusher bar.

10. A conveying apparatus comprising an elongated central frame, a work supporting rail mounted on and encircling said frame comprising a pair of straight side sections connected at the ends thereof by arcuate sections, a plurality of work carriers movably mounted on said supporting rail, each of said work carriers including a work supporting arm extending outwardly and laterally of said supporting rail, a reciprocating pusher means mounted on said frame and disposed longitudinally of each of said straight side supporting rail sections intermittently advancing said work carriers therealong, rotatable pusher means disposed adjacent said arcuate supporting rail sections for intermittently advancing said work carriers therealong, means for reciprocating said reciprocating pusher means and for oscillating said rotatable pusher means, a cam track mounted on said reciprocating pusher means comprising a series of longitudinally spaced aligned elevating cams and horizontal sections forming a continuous track for laterally supporting said work supporting arms along said side sections and for moving said supporting arms to and from a raised position and a lowered position in a predetermined sequence upon longitudinal reciprocation of said pusher means, and an arcuate cam track concentrically disposed adjacent said arcuate supporting rail sections for laterally supporting said work supporting arms along said arcuate sections.

11. In a processing machine, the combination comprising a rail, a work carrier mounted on said rail having an arm extending laterally of said rail, longitudinally extending reciprocating means including a first cam having at least one surface spaced from the longitudinal axis of said reciprocating means, second cam means having a configuration similar to said first cam means mounted adjacent and to the side of said first cam means and movable along a path substantially parallel to that of said reciprocating means, means for reciprocating said reciprocating means and for moving said second cam means.

12. In a processing machine, the combination comprising a rail, a work carrier mounted on said rail having an arm extending laterally of said rail, longitudinally extending reciprocating means including a first cam having at least one surface spaced from the longitudinal axis of said reciprocating means, second cam means having a configuration similar to said first cam means mounted adjacent and to the side of said first cam means and movable along a path substantially parallel to that of said reciprocating means, and means connecting said second cam means to said reciprocating means so that said second cam means is moved thereby.

13. In a processing machine, the combination comprising a rail, a work carrier mounted on said rail having an arm extending laterally of said rail, longitudinally extending reciprocating means including a first cam having at least one surface spaced from the longitudinal axis of said reciprocating means, second cam means having a configuration similar to said first cam means mounted adjacent and to the side of said first cam means and movable along a path substantially parallel to that of said reciprocating means, and means connecting said second cam means to said reciprocating means, said connecting means being adjustable to a first position to cause said second cam means to reciprocate with said reciprocating means and a second position to cause said second cam means to be retracted only a portion of the length of a full stroke of said reciprocating means.

14. In a processing machine, the combination comprising a rail, a work carrier mounted on said rail having an arm extending laterally of said rail, combination means including a longitudinally reciprocable pusher bar, a series of longitudinally spaced pushers on said bar for advancing said work carrier along said rail during the advancing stroke, a plurality of longitudinally spaced vertically aligned cams on said bar, each of said cams having a lifting surface and a lowering surface spaced from the longitudinal axis of said pusher bar such that contact of said arm with said lifting surface and said lowering surface causes said arm to be elevated and lowered during the retracting movement of said bar, means for reciprocating said bar, and means for maintaining said arm in the raised position for at least two successive advancing strokes of said pusher bar.

15. A conveying apparatus comprising a frame, a work supporting rail mounted on said frame, a plurality of work carriers movably mounted on said work supporting rail, each of said work carriers including a pivotally mounted work supporting arm extending laterally of said supporting rail, a reciprocating pusher bar slidably mounted on said frame adjacent to said supporting rail, means for reciprocating said bar, a series of longitudinally spaced pushers on said pusher bar for engaging and advancing said work carriers along said rail, a plurality of longitudinally spaced cams on said pusher bar, each of said cams having at least one surface spaced from the longitudinal axis of said pusher bar such that contact of said cam surfaces and said work supporting arms causes said arms to pivot from and to a raised position and a lowered position during the retracting stroke of said pusher bar, and means for maintaining at least one of said supporting arms in the raised position for at least two successive advancing strokes of said pusher bar thereby providing a skip operation.

References Cited in the file of this patent
UNITED STATES PATENTS 1,706,526    Hannon ______________ Mar. 26, 1929